United States Patent
Trichias et al.

(10) Patent No.: US 12,388,909 B2
(45) Date of Patent: Aug. 12, 2025

(54) AUCTIONING THE SERVING AND/OR CACHING OF A DATA OBJECT

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Konstantinos Trichias, Athens (GR); Lucia D'Acunto, Delft (NL); Bastiaan Frederik Wissingh, Leiden (NL); Eelco Reinier Cramer, Amsterdam (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/186,372

(22) Filed: Nov. 9, 2018

(65) Prior Publication Data
US 2019/0158621 A1 May 23, 2019

(30) Foreign Application Priority Data
Nov. 21, 2017 (EP) .................................... 17202679

(51) Int. Cl.
*H04L 67/63* (2022.01)
*H04L 67/02* (2022.01)
(Continued)

(52) U.S. Cl.
CPC .......... *H04L 67/5682* (2022.05); *H04L 67/02* (2013.01); *H04L 67/568* (2022.05); *H04L 67/63* (2022.05)

(58) Field of Classification Search
CPC . H04L 67/2852; H04L 67/02; H04L 67/2842; H04L 67/327; H04L 67/10
See application file for complete search history.

(56) References Cited

U.S. PATENT DOCUMENTS 10,460,348 B1 * 10/2019 Peddinti ............. G06Q 30/0277
10,715,592 B2 * 7/2020 Gill ..................... H04L 67/5682
(Continued)

FOREIGN PATENT DOCUMENTS

EP          3 244 590 A1      11/2017

OTHER PUBLICATIONS

European Patent Office, Extended European Search Report for EP Pat. App. No. 17202679.1 dated May 9, 2018.
(Continued)

*Primary Examiner* — Dhairya A Patel
(74) *Attorney, Agent, or Firm* — McDonnell Boehnen Hulbert & Berghoff LLP

(57) ABSTRACT

A method comprises receiving a data object request to serve a data object and transmitting bid requests to a plurality of systems. The data object request identifies the data object and the bid requests comprise information relating to the data object and request the plurality of systems to provide a bid value for serving and/or caching the data object. The method further comprises determining a best bid from one or more bid values received in response to the transmitted bid requests and redirecting or forwarding the data object request to the system which transmitted the best bid and/or requesting the system which transmitted the best bid to cache the data object.

14 Claims, 9 Drawing Sheets

(51) Int. Cl.
*H04L 67/568* (2022.01)
*H04L 67/5682* (2022.01)

(56) References Cited

U.S. PATENT DOCUMENTS

| | | | |
|---|---|---|---|
| 2002/0099616 A1 | 7/2002 | Sweldens | |
| 2003/0195813 A1* | 10/2003 | Pallister | G06Q 40/04 |
| | | | 705/26.3 |
| 2007/0067424 A1* | 3/2007 | Raciborski | H04L 67/1023 |
| | | | 709/223 |
| 2007/0088703 A1* | 4/2007 | Kasiolas | G06F 3/0605 |
| 2007/0133570 A1* | 6/2007 | Khan | H04L 12/66 |
| | | | 370/395.2 |
| 2010/0125507 A1* | 5/2010 | Tarantino, III | G06Q 30/0273 |
| | | | 705/37 |
| 2011/0131341 A1* | 6/2011 | Yoo | G06F 16/9574 |
| | | | 709/230 |
| 2011/0185041 A1* | 7/2011 | Hunt | H04L 65/1069 |
| | | | 709/219 |
| 2012/0254456 A1* | 10/2012 | Visharam | H04L 65/762 |
| | | | 709/231 |
| 2012/0278549 A1* | 11/2012 | Dutton | G06F 1/3287 |
| | | | 711/E12.001 |
| 2013/0290124 A1* | 10/2013 | Drake | G06Q 30/08 |
| | | | 705/26.3 |
| 2014/0095324 A1* | 4/2014 | Cabral | G06Q 30/08 |
| | | | 705/14.71 |
| 2015/0339730 A1* | 11/2015 | Endo | G06Q 30/0275 |
| | | | 705/14.71 |
| 2016/0239831 A1* | 8/2016 | Saunders | G06Q 20/4016 |
| 2017/0034011 A1* | 2/2017 | Butler | H04L 41/30 |
| 2018/0173426 A1* | 6/2018 | Condict | G06F 3/0631 |
| 2019/0306234 A1* | 10/2019 | Gill | H04L 67/5682 |

OTHER PUBLICATIONS

B. Niven-Jenkins et al., Request Routing Redirection Interface for Content Delivery Network (CDN) Interconnection, Internet Engineering Task Force (IETF) Request for Comments 7975, Oct. 2016.
L Sun et al., Beyond 1 Million Nodes: A Crowdsourced Video Content Delivery Network, Jul. 15, 2017, IEEE MultiMedia, Jul.-Sep. 2017, pp. 54-63.
ESI Language Specification 1.0, W3C Note Aug. 4, 2001, Tsimelzon et al.
Framework for Content Distribution Network Interconnection (CDNI), Internet Engineering Task Force (IETF), Request for Comments: 7336, Aug. 2014.

* cited by examiner

AUCTIONING THE SERVING AND/OR CACHING OF A DATA OBJECT

CROSS-REFERENCE TO RELATED APPLICATIONS

This application claims priority under 35 U.S.C. § 119 to European Patent Application No. 17202679.1 filed on Nov. 21, 2017. European Patent Application No. 17202679.1 is hereby incorporated by reference in its entirety for all purposes.

FIELD OF THE DISCLOSURE

Herein is disclosed a system for requesting a bid for serving and/or caching a data object and a system for providing a bid for serving and/or caching a data object.

Herein is disclosed a method of requesting a bid for serving and/or caching a data object and a method of providing a bid for serving and/or caching a data object.

Herein is disclosed a computer program product enabling a computer system to perform such methods.

BACKGROUND

A Content Delivery Network (CDN) delivers content on behalf of a Content Server Provider (CSP). For example, if a user-agent (UA) requests web content, a CSP server might redirect the UA to an URL belonging to a CDN node which will serve the page on behalf of the CSP. The CDN node itself could act as an upstream CDN (uCDN) node forwarding the UA to a delegate CDN node called a downstream CDN (dCDN) node.

There is a working group within the Internet Engineering Task Force (IETF) which aims to standardize the way CDNs could work together. RFC-7336 ("Framework for Content Distribution Network Interconnection") specifies a Request-Routing Interface (RI) that is used to check if a dCDN node is willing to (or able to) serve an HTTP request sent to an uCDN node. If this is the case, the uCDN node will redirect the UA to the dCDN node that will serve the content to the UA.

This RI interface is further detailed in RFC-7975: "Request Routing Redirection Interface for Content Delivery Network (CDN) Interconnection". This RFC specifies that an uCDN node can query multiple dCDN nodes before selecting which dCDN node should handle the request. In order to perform redirection of the UA's HTTP request, the uCDN node queries one or more dCDN nodes so that the dCDN can select and provide a Redirection Target. In cases where a uCDN node has a choice of dCDN nodes, it is normally up to the uCDN node to decide which dCDN node(s) to query and in which order to query them. This RFC further specifies that a dCDN node uses the information from the request and metadata about the content to determine if it is willing to serve the content.

Normally, the uCDN node selects a dCDN node that returns a Redirection Target. For example, the UA may be redirected to the first queried dCDN node that is willing to serve the content and this dCDN node may then cache the content if the content is regarded as sufficiently attractive. However, this results in a suboptimal distribution of tasks: the first queried dCDN node that is willing to serve content may not be the best choice for serving this content and may not be the best choice for caching this content.

An alternative method of deciding which dCDN node should cache which content is disclosed in "Beyond 1 Million Nodes: A Crowdsourced Video Content Delivery Network", Lifeng Sun et al., published in IEEE MultiMedia Volume 24, Issue 3, 2017, pages 54-63. This publication discloses allowing CSPs to bid for caching space in content hotspots. A drawback of this method is that it is a bidding concept per CSP and not per dCDN node and is thus based on economic value, which cannot be used for deciding which caching node is the best caching node. Use of this method for a bidding concept per dCDN node would require the CSPs to have a significant amount of information relating to both the content (popularity) and the dCDN nodes (existence and position/cost) in order to decide how much to bid, which CSPs often do not have.

SUMMARY

In a first aspect, a system is provided for requesting a bid for serving and/or caching a data object, which helps ensure that content is served and/or cached efficiently in a content delivery network.

In a second aspect, a system is provided for providing a bid for serving and/or caching a data object, which helps ensure that content is served and/or cached efficiently in a content delivery network.

In a third aspect, a method is provided for requesting a bid for serving and/or caching a data object, which helps ensure that content is served and/or cached efficiently in a content delivery network.

In a fourth aspect, a method is provided for providing a bid for serving and/or caching a data object, which helps ensure that content is served and/or cached efficiently in a content delivery network.

The first aspect can be realized in that the system for requesting a bid for serving and/or caching a data object comprises at least one receiver, at least one transmitter, and at least one processor configured to use said at least one receiver to receive a data object request to serve a data object, said data object request identifying said data object, use said at least one transmitter to transmit bid requests to a plurality of further systems, said bid requests comprising information relating to said data object and requesting said plurality of further systems to provide a bid value for serving and/or caching said data object, determine a best bid from one or more bid values received in response to said transmitted bid requests, and use said at least one transmitter to redirect or forward said data object request to the further system which transmitted said best bid and/or request the further system which transmitted said best bid to cache said data object. Said data object request may further identify a requestor of said data object. Said information relating to said data object may identify said data object and/or may describe said data object, e.g. include a popularity, content type and/or size of said data object.

By requesting the dCDN nodes to bid for serving and/or caching data objects and redirecting or forwarding data object requests (e.g. HTTP requests) to the dCDN node with the highest bid and/or informing the dCDN node with the highest bid that they have won the auction by sending them a cache request, content may be served and/or cached efficiently. Centralized auctioning ensures that the auctioning is fast, but by determining which dCDN node should cache a data object based on information from the dCDN nodes, a better distribution of tasks is achieved. Furthermore, dCDN nodes possess the right information to make a valid bid, ensuring optimization of caching capacity and quality of experience delivered to the UA. The system may be an uCDN node or CSP server, for example.

Said at least one processor may be configured to use said at least one transmitter to transmit said data object to said further system which transmitted said best bid. If the dCDN node that has won the auction does not possess the data object, e.g. if it provided a high bid because the data object was considered to be a valuable addition to its cache, it may be configured to request the data object from the uCDN node or CSP server that held the auction or it may automatically receive the data object from the uCDN node that held the auction or on behalf of the CSP server that held the auction, for example.

Said at least one processor may be configured to use said at least one transmitter to transmit a request for said data object to a content provider server if said data object is not stored in a memory of said system or if only an older, expired version of said data object is stored in a memory of said system and use said at least one receiver to receive said data object from said content provider server. If a uCDN node receives a request for a data object from a dCDN node, but does not possess the data object itself, it may request the data object from a CSP server.

The second aspect can be realized in that the system for providing a bid for serving and/or caching a data object comprises at least one receiver, at least one transmitter, and at least one processor configured to use said at least one receiver to receive a bid request from another system, said bid request comprising information relating to said data object and requesting said system to provide a bid value for serving and/or caching a data object, determine a bid value in response to said request (said bid value possibly being determined based on said information in said request), and use said at least one transmitter to transmit said bid value to said other system, wherein said at least one processor is further configured to use said at least one transmitter to serve said data object to a requestor in response to receiving a data object request, said data object request identifying said data object (and possibly said requestor, for example), and/or said at least one processor is further configured to cache said data object in a memory of said system in response to receiving said data object or cache request identifying said data object.

A bid value for caching a data object may be determined in the same way as described in "BidCache: Auction-Based In-Network Caching in ICN", Amritpal Singh Gill, Lucia D'Acunto, Konstantinos Trichias, and Ray van Brandenburg, published in IEEE Globecom Workshops, 4-8 Dec. 2016. However, the method described in this publication is intended for ICNs and not suitable for traditional CDNs which expect HTTP requests. Furthermore, the decentralized approach described in this publication is not optimal for these traditional CDNs.

Said at least one processor may be configured to determine said bid value based on whether said system wants to serve said data object. Thereby, serving tasks may be distributed efficiently.

Said at least one processor may be configured to determine said bid value based on whether said system wants to cache said data object in response to receiving a request to cache said data object. Thereby, caching tasks may be distributed efficiently. In this case, two sets of bid requests may be transmitted to dCDN nodes: one for requesting a bid for serving the data object and one for requesting a bid for caching the data object. These bid requests may be transmitted to the same set of dCDN nodes or to different sets of dCDN nodes. Alternatively, a dCDN node for serving the data object may be chosen in a conventional manner, e.g. by contacting dCDN nodes one by one until a dCDN node is found that is willing to serve the data object, and bid requests are only transmitted for caching the data object.

Said at least one processor may be configured to determine said bid value object based on whether said system wants to cache said data object in response to receiving a request to serve said data. If a dCDN node bids for getting a data object request redirected to it, it may determine the bid based on whether it wants to serve the data object, e.g. because it has the data object in its cache and/or the dCDN node is close to the requestor, but it may additionally or alternatively determine the bid based on whether it wants to cache the data object. For example, the dCDN node may not have the data object in its cache, but the data object may be determined or expected to be a valuable addition to its cache.

Said at least one processor may be configured to determine a poor bid value if said data object is stored in a memory of said system. For example, if the dCDN node is not close to the requestor, caching might be the only reason left for making a good bid for serving and caching a data object, but if the dCDN node already possesses the data object and does not need to bid for renewing the data object (e.g. the data object's freshness is not close to a threshold indicating that the data object is too old), there is normally no reason left for making a good bid. If the bid is only for caching the data object and the dCDN node does not need to bid for renewing the data object, there is normally no reason for making a good bid if the dCDN node already possesses the data object.

Said at least one processor may be configured to only transmit said bid value to said other system if said data object is not stored in a memory of said system. For example, if the dCDN node is not close to the requestor, caching might be the only reason left for making a bid for serving and caching a data object, but if the dCDN node already possesses the data object and does not need to bid for renewing the data object, there is normally no reason left for making a bid. If the bid is only for caching the data object and the dCDN node does not need to bid for renewing the data object, there is normally no reason for making a bid if the dCDN node already possesses the data object. The at least one processor may be configured to transmit no response to the bid request or transmit a response explicitly stating that it does not want to bid instead of the bid value. In the latter case, the reason (e.g. it already has the object in its cache) may also be stated in the response.

Said at least one processor may be configured to use said at least one transmitter to request said data object from said other system, from a location identified in said data object request or from a location identified in said cache request. If the dCDN node makes a bid because it wants to cache the data object, but does not possess the data object, it may request it from the uCDN node or CSP that holds the auction or from the CSP if the uCDN node holds the auction, for example. In the latter case, the location where the data object may be requested is preferably included in the data object request or cache request. Alternatively, the uCDN node that holds the auction may automatically transmit the data object to the dCDN node, for example.

Said at least one processor may be configured to determine said bid value based on at least one of the following parameters: availability of resources in said system, availability of said data object in one or more memories of said system, content provider of said data object, proprietor of said other system, expected popularity of said data object, and content type of said data object. Availability of resources, e.g. CPU, RAM, disk space and network bandwidth, may influence whether the system wants to serve the data object and/or whether the system wants to cache the data object. The availability of the data object in a memory of the system may result in a good bid for serving the data object, but in a poor bid for caching the data object. The system may take into account who the content provider of the data object is and/or who the proprietor of the other system is. If they are not the same as or do not have a relationship with the proprietor of the system, then the bid may be reduced. The expected popularity of the data object and the content type of the data object may influence the value of adding the data object to the cache and therefore a bid for caching the data object.

Said at least one processor may be configured to determine said bid value based on at least one of the following parameters relating to said requestor identified in said data object request: location of said requestor, network access provider of said requestor, and time it takes data to travel from said system to said requestor. These parameters may be beneficially taken into account when determining a bid value for serving the data object. For example, a dCDN node may prefer to serve content to users of certain ISPs, users in certain countries and/or nearby users.

The third aspect can be realized in that the method of requesting a bid for serving and/or caching a data object comprises receiving a data object request to serve a data object, said data object request identifying said data object, transmitting bid requests to a plurality of systems, said bid requests comprising information relating to said data object and requesting said plurality of systems to provide a bid value for serving and/or caching said data object, determining a best bid from one or more bid values received in response to said transmitted bid requests, and redirecting or forwarding said data object request to the system which transmitted said best bid and/or requesting the system which transmitted said best bid to cache said data object. Said method may be performed by software running on a programmable device. This software may be provided as a computer program product.

The fourth aspect can be realized in that the method of providing a bid for serving and/or caching a data object comprises receiving at a system a bid request from another system, said bid request comprising information relating to said data object and requesting said system to provide a bid value for serving and/or caching a data object, determining a bid value in response to said request (said bid value possibly being determined based on said information in said request), transmitting said bid value to said other system, and serving said data object to a requestor in response to receiving a data object request, said data object request identifying said data object (and possibly said requestor, for example), and/or caching said data object in a memory of said system in response to receiving a data object or cache request identifying said data object. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving a data object request to serve a data object, said data object request identifying said data object, transmitting bid requests to a plurality of systems, said bid requests comprising information relating to said data object and requesting said plurality of systems to provide a bid value for serving and/or caching said data object, determining a best bid from one or more bid values received in response to said transmitted bid requests, and redirecting or forwarding said data object request to the system which transmitted said best bid and/or requesting the system which transmitted said best bid to cache said data object.

A non-transitory computer-readable storage medium stores at least a second software code portion, the second software code portion, when executed or processed by a computer, being configured to perform executable operations comprising: receiving at a system a bid request from another system, said bid request comprising information relating to said data object and requesting said system to provide a bid value for serving and/or caching a data object, determining a bid value based in response to said request (said bid value possibly being determined on said information in said request), transmitting said bid value to said other system, and serving said data object to a requestor in response to receiving a data object request, said data object request identifying said data object (and possibly said requestor, for example), and/or caching said data object in a memory of said system in response to receiving a data object or cache request identifying said data object.

As will be appreciated by one skilled in the art, aspects of the present disclosure may be embodied as a device, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present disclosure may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present disclosure may be written in any combination of one or more programming languages, including an object oriented programming language such as Java(TM), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the disclosure are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
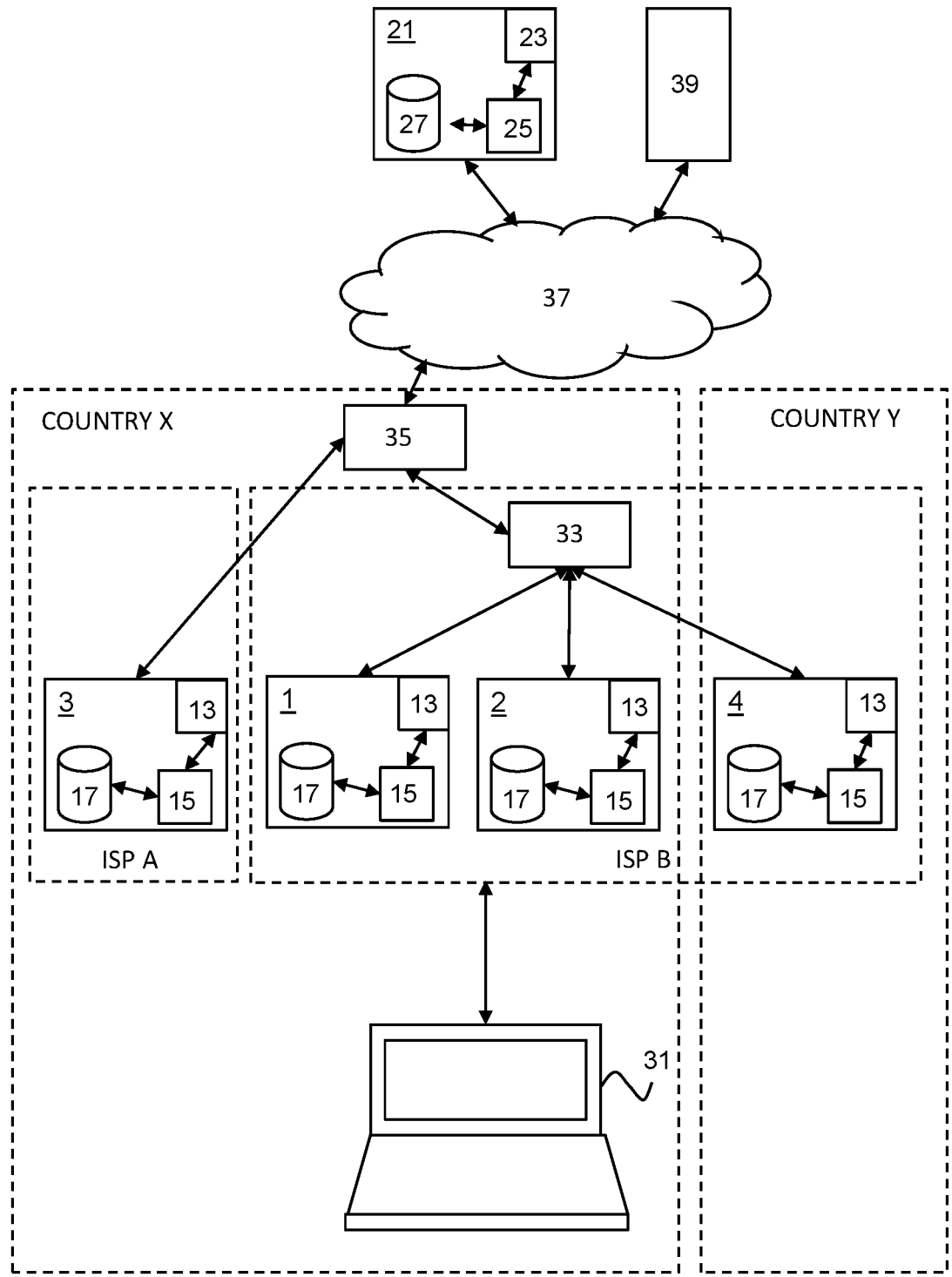
FIG. 1 is a block diagram of a system, according to example embodiments.

FIG. 1 depicts embodiments of the system for requesting a bid and the system for providing a bid of the disclosure. In the example of FIG. 1, a UA 31 is connected to the network of an ISP B in country X, dCDN nodes 1, 2 and 4 are part of the network of the same network access provider: ISP B, and dCDN node 3 is part of the network of a different network access provider: ISP A. Furthermore, dCDN nodes 1-3 are located in the same country: country X, and dCDN node 4 is located in a different country: country Y. dCDN nodes 1, 2 and 4 are interconnected via a network router 33 of ISP B in country X. The networks of ISP A and ISP B are interconnected via a network router 35 in country X. In the example of FIG. 1, the UA 31 transmits a data object request to a Content Service Provider (CSP) server 39, which redirects the data object request to a uCDN node 21. The uCDN node 21 then requests a bid from four dCDN nodes 1-4. The uCDN node 21, the CSP server 39 and the network router 35 are interconnected via Internet equipment 37.

The uCDN node 21 comprises a transceiver 23 and a processor 25. The processor 25 is configured to use the transceiver 23 to receive a data object request to serve a data object and transmit bid requests to the dCDN nodes 1-4. The data object request identifies the data object and the requestor (UA 31) and the bid requests comprise information relating to the data object and request the dCDN nodes to provide a bid value for serving and/or caching the data object. The uCDN node 21 is further configured to determine a best bid from one or more bid values received in response to the transmitted bid requests and use the transceiver 23 to redirect the data object request to the dCDN node which transmitted the best bid and/or to request the dCDN node which transmitted the best bid to cache the data object.

The dCDN nodes 1-4 each comprise a transceiver 13 and a processor 15. The processor 15 is configured to use the transceiver 13 to receive the bid request from the uCDN node 21, determine a bid value based on the information in the request and use the transceiver 13 to transmit the bid value to the uCDN node 21. The processor 15 is further configured to use the transceiver 13 to serve the data object to the UA 31 in response to receiving a data object request and/or the processor 15 is further configured to cache the data object in a memory 17 in response to receiving a data object request or cache request identifying the data object. The UA 31 may be a laptop, mobile phone, tablet, or other user/client device, for example.

In the embodiment shown in FIG. 1, the processor 15 of the dCDN nodes 1-4 is configured to use the transceiver 13 to request the data object from the uCDN node 21, from a location identified in the data object request or from a location identified in the cache request when they have the best bid. The processor 25 of the uCDN node 21 is configured to use the transceiver 23 to transmit the data object to the dCDN node which transmitted the best bid in response to a request from a dCDN node.

In an alternative embodiment, the processor 25 of the uCDN 21 is configured to use the transceiver 23 to transmit the data object to the dCDN node which transmitted the best bid automatically, i.e. without receiving a request first. In the embodiment shown in FIG. 1, the processor 25 of the uCDN node 21 is further configured to use the transceiver 23 to transmit a request for the data object to the CSP server 39 if the data object is not stored in the memory 27 and use the transceiver 23 to receive the data object from the CSP server 39.

In the embodiment shown in FIG. 1, the processor 15 of the dCDN nodes 1-4 is configured to determine the bid value based on whether the dCDN node wants to cache the data object in response to receiving a request to serve the data object. This will be explained in relation to FIG. 2. In the same or in a different embodiment, the processor 15 is configured to determine the bid value based on whether the dCDN node wants to cache the data object in response to receiving a request to cache the data object. This will be explained in relation to FIG. 3 and FIG. 6. In the same or in a different embodiment, the processor 15 is configured to determine the bid value based on whether the dCDN node wants to serve the data object. This will be explained in relation to FIG. 7.

If the processor 15 is configured to determine the bid value based on whether the dCDN node wants to cache the data object, the processor 15 may further be configured to determine a poor bid value or not to transmit the bid value to the uCDN node 21 if the data object is already stored in its memory 17 (and in certain embodiments: if it does not want to renew the data object already stored in its memory 17 either).

In the embodiment of FIG. 1, the processor 15 of the dCDN nodes 1-4 is configured to determine the bid value based on at least one of the following parameters:
availability of resources in the dCDN node;
availability of the data object in one or more memories of the dCDN node;
content provider of the data object;
proprietor of the uCDN node;
expected popularity of the data object;
content type of the data object.
location of the UA;
network access provider of the UA; and
time it takes data to travel from the system to the UA.

Since in the example of FIG. 1, dCDN node 3 is located in the network of a different network access provider (ISP A) than UA 31 (which is connected to ISP B) and dCDN node 4 is located in a different country (country Y) than UA 31 (which is located in country X), the bids of dCDN nodes 1 and 2, which are both part of the network of ISP B and located in country X, are normally expected to be the best bids.

However, there may be other reasons for dCDN node 3 or 4 to provide the best bid, e.g. because the data object is expected to be more popular in country Y, because ISP A has not cached the data object yet or because dCDN nodes 1 and 2 are relatively low on resources. The bid value determined by a dCDN may depend on whether the company that owns the dCDN has a Service Level Agreement (SLA) with the content provider of the data object and/or the proprietor of the uCDN. Multiple parameters may be taken into account when determining the bid value and different weights may be applied to the values of the multiple parameters. The auction may be configured to award the auction win to the highest bidder or to the lowest bidder. The method of calculating the bid is configured accordingly to the type of auction.

In the embodiment shown in FIG. 1, the dCDNs 1-4 comprises one processor 15. In an alternative embodiment, the dCDNs 1-4 comprises multiple processors. The processor 15 of the dCDNs 1-4 may be a general-purpose processor, e.g. an Intel or an AMD processor, or an application-specific processor, for example. The processor 15 may comprise multiple cores, for example. The processor 15 may run a Unix-based or Windows operating system, for example.

The transceiver 13 may use the Ethernet protocol to communicate with a wireline network, for example. The dCDNs 1-4 may comprise other components typical for a server on the Internet, e.g. a power supply. In the embodiment shown in FIG. 1, the dCDNs 1-4 each comprises one device. In an alternative embodiment, one or more of the dCDNs 1-4 each comprise multiple devices. The memory 17 may comprise one or more magnetic hard disks, one or more optical drives, and/or one or more solid state memories, for example. The memory 17 may be used to store data objects, for example.

In the embodiment shown in FIG. 1, the uCDN 21 comprises one processor 25. In an alternative embodiment, the uCDN 21 comprises multiple processors. The processor 25 of the uCDN 21 may be a general-purpose processor, e.g. an Intel or an AMD processor, or an application-specific processor, for example. The processor 25 may comprise multiple cores, for example. The processor 25 may run a Unix-based or Windows operating system, for example.

The transceiver 23 may use the Ethernet protocol to communicate with a wireline network, for example. The uCDN 21 may comprise other components typical for a server on the Internet, e.g. a power supply. In the embodiment shown in FIG. 1, the uCDN 21 comprises one device. In an alternative embodiment, the uCDN 21 comprises multiple devices. The memory 27 may comprise one or more magnetic hard disks, one or more optical drives, and/or one or more solid state memories, for example. The memory 27 may be used to store data objects, for example. In the embodiment of FIG. 1, it is the uCDN 21 that holds the auction. In an alternative embodiment, the disclosure may be implemented in the CSP server 39.

Figure 2:
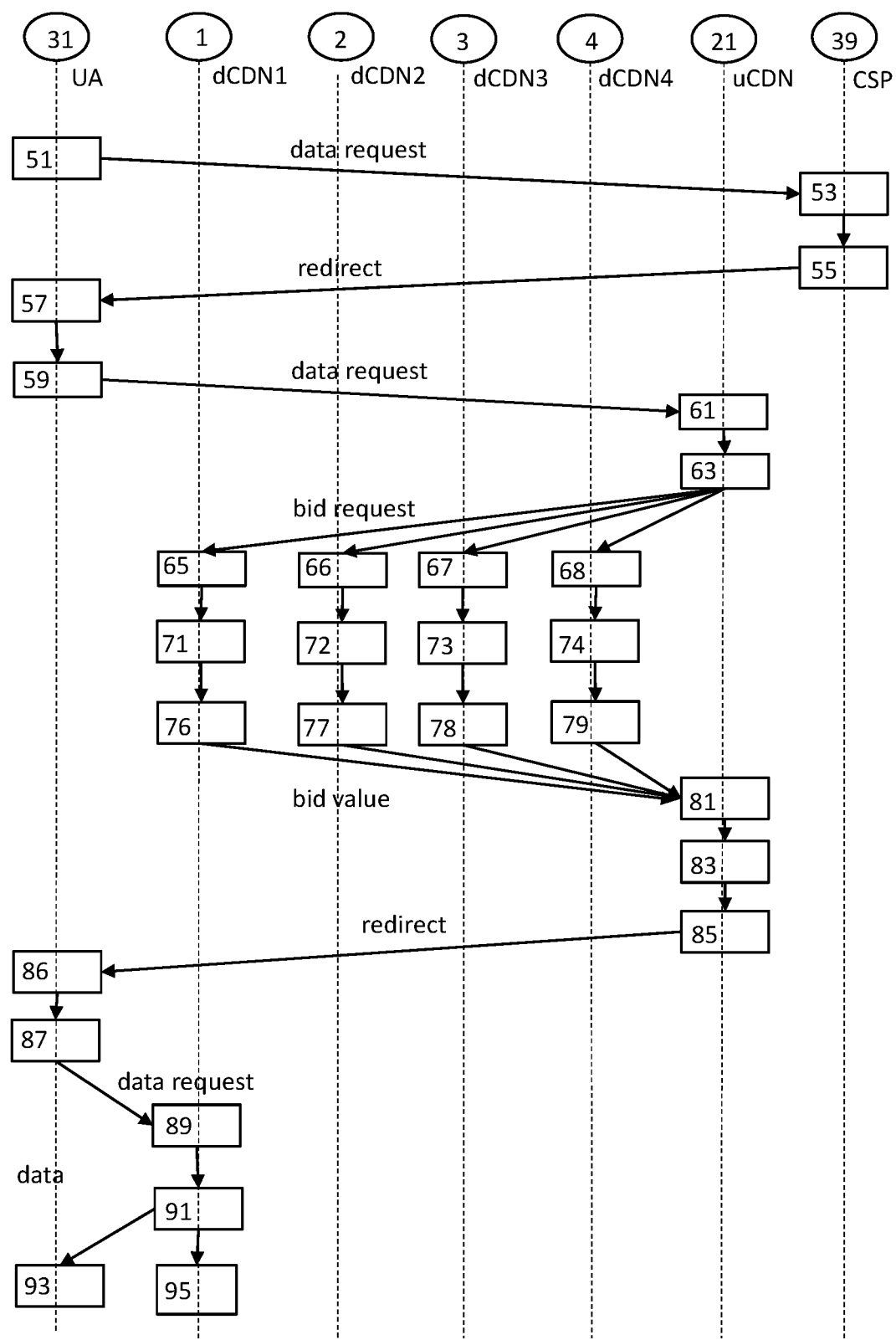
FIG. 2 is a flow diagram of a method, according to example embodiments.

First embodiments of the method of requesting a bid and the method of providing a bid are shown in FIG. 2. In the embodiment of FIG. 2, four dCDN nodes bid for serving a data object in an auction held by a uCDN node. A step 51 comprises a User Agent (UA), e.g. a laptop, mobile phone or tablet, transmitting a data object request, e.g. an HTTP request, to a server of a Content Service Provider (CSP). The data object request identifies the data object and the requestor, i.e. the UA. The data object request may comprise an URI, for example. A step 53 comprises the server of the CSP receiving the request.

A step 55 comprises the CSP server sending a response to the UA in order to redirect the data request to a uCDN node, e.g. by transmitting an HTTP response with a status code beginning with 3 and an URI of the uCDN node, which causes the UA's browser to transmit a new data request with the URI of the uCDN node in step 59 after receipt of the response in step 57. In the embodiment of FIG. 2, the server of the CSP implements the redirection. In an alternative embodiment, a server between the UA and the CSP server intercepts the data request and implements the redirection.

A step 61 comprises the uCDN node receiving the data object request. A step 63 comprises the uCDN node transmitting bid requests to the four dCDN nodes. The bid requests comprise information relating to the data object and request the four dCDN nodes to provide a bid value for serving the data object. Steps 65 to 68 comprise the four dCDN nodes receiving the bid requests from the uCDN nodes.

Steps 71 to 74 comprises the four dCDN nodes determining a bid value in response to receiving the request and in most situations based on the information in the request. Steps 76 to 79 comprise the four dCDN nodes transmitting the determined bid values to the uCDN. A step 81 comprises the uCDN node receiving the bid requests from the dCDN nodes. A step 83 comprises the uCDN node determining a best bid from the bid values received in response to the transmitted bid requests.

A step 85 comprises the uCDN node sending a response to the UA in order to redirect the data object request to the dCDN which transmitted the best bid: dCDN1, e.g. by transmitting an HTTP response with a status code beginning with 3 and an URI of dCDN1, which causes the UA's browser to transmit a new data request with the URI of dCDN1 in step 87 after receipt of the response in step 86. Step 89 comprises dCDN1 receiving the data object request from the UA. Step 91 comprises dCDN1 serving the data object to the UA in response to receiving the data object request. Step 95 comprises dCDN1 storing the data object in its cache.

In the embodiment of FIG. 2, the dCDN nodes bid for serving a data object and determine their bid value based on whether they want to serve the data object and based on whether they want to cache the data object. For example, dCDN3 may not be very interested in serving the data object to the UA, because the UA is using another network access provider, but may transmit a good bid value anyway, because it would like to store the data object in its cache. In a variant on this embodiment, the dCDN nodes determine their bid value only based on whether they want to serve the data object or only based on whether they want to cache the data object.

Figure 3:
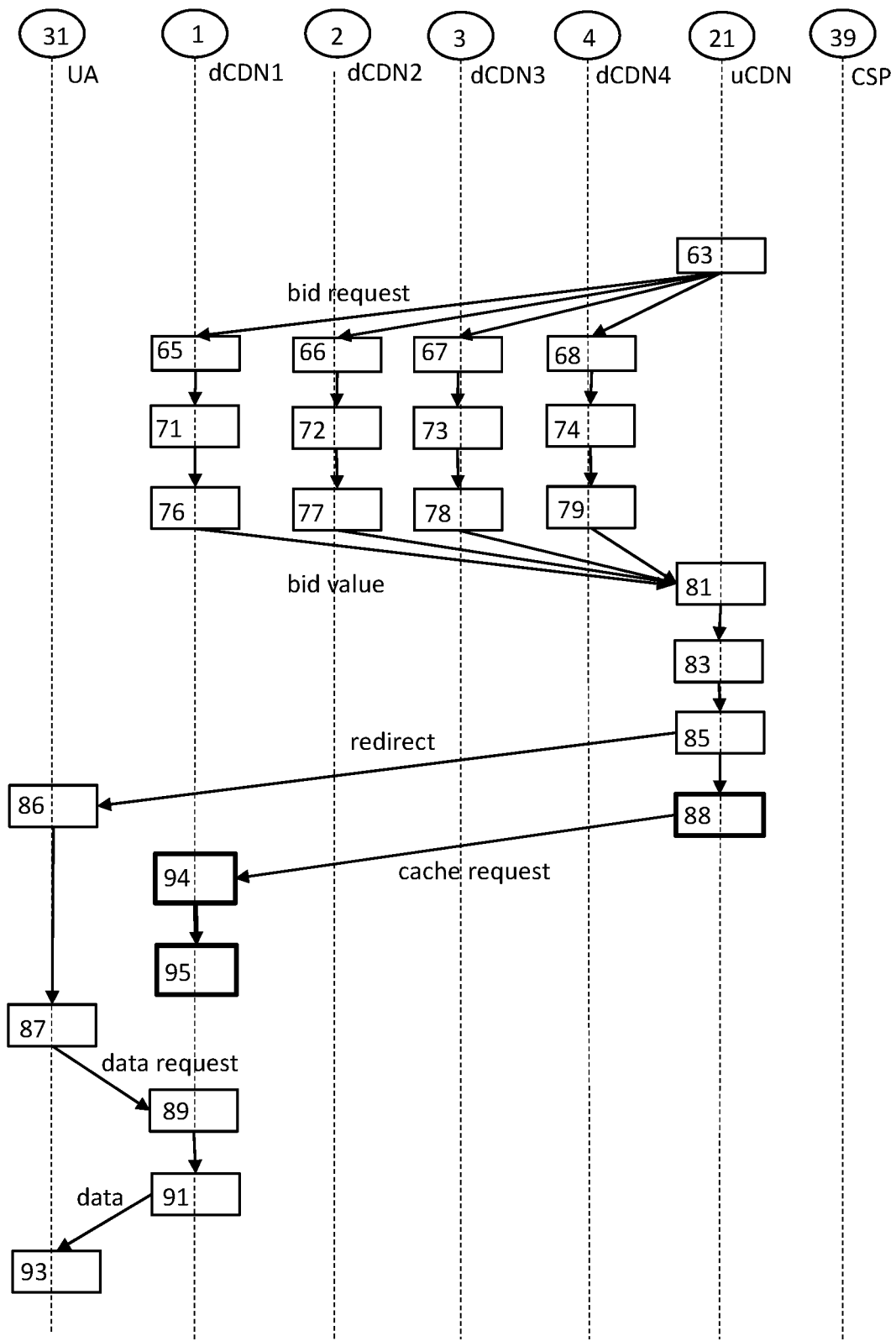
FIG. 3 is a flow diagram of a first extension of the method of FIG. 2, according to example embodiments.

In the embodiment of FIG. 2, dCDN1 caches the data object in step 95 upon receipt of the data object request in step 89. In the embodiment shown in FIG. 3, the dCDN nodes bid for serving and caching a data object and dCDN1 caches the data object only after receipt of a cache request. The uCDN node transmits the cache request to dCDN1, which transmitted the best bid, in step 88. dCDN1 then receives the cache request in step 94 and stores the data object in its cache in step 95 upon receipt of the cache request. In the example of FIG. 3, dCDN1 receives the cache request from the uCDN before it receives the data request from the UA. Alternatively, dCDN1 may receive the cache request from the uCDN and the data request from the UA in parallel, for example.

Figure 4:
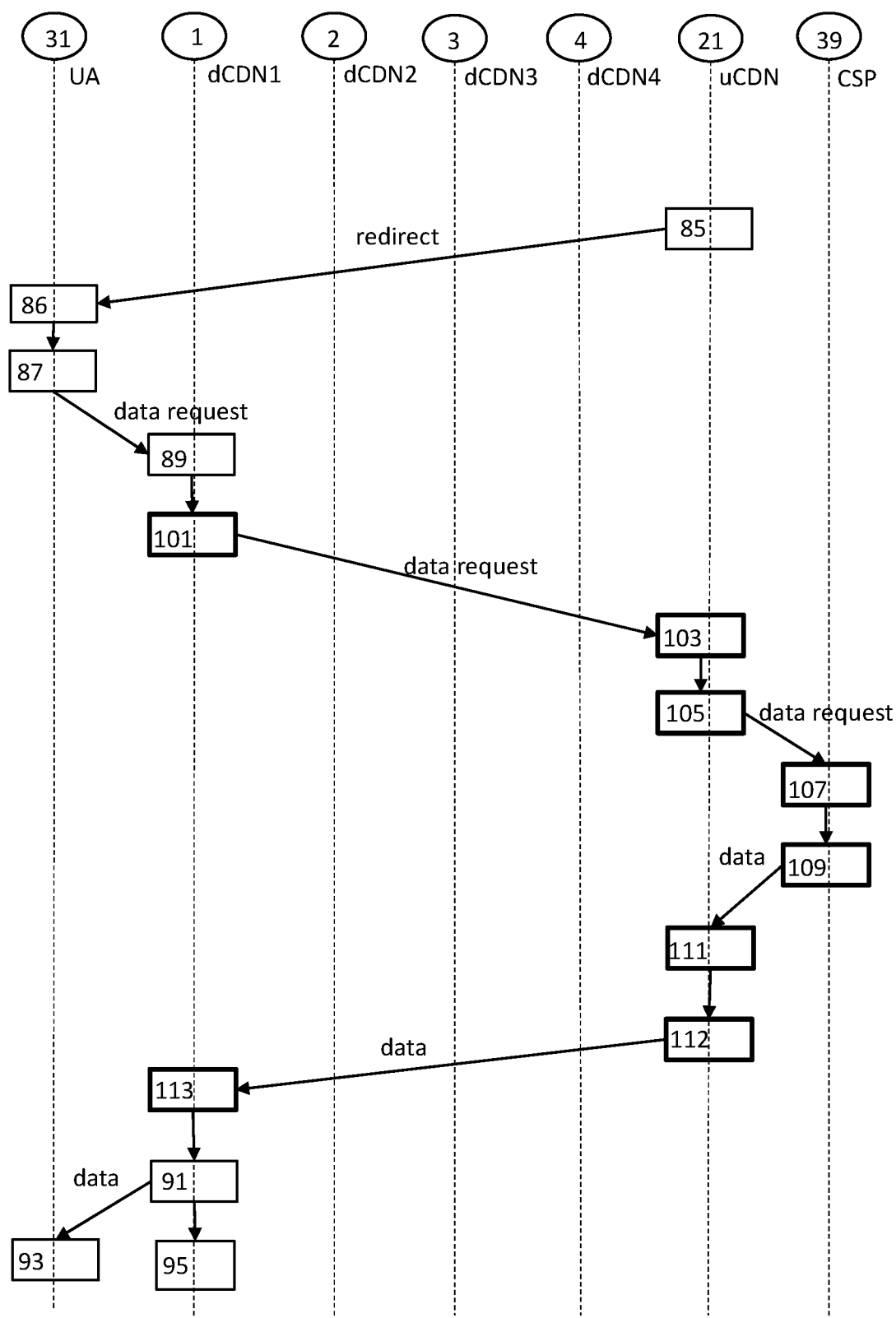
FIG. 4 is a flow diagram of a second extension of the method of FIG. 2, according to example embodiments.

In the embodiment of FIG. 2, dCDN1 had the best bid. However, dCDN1 may not possess the data object to which the bid related. FIG. 4 shows additional steps which may be performed in this situation. Step 101 comprises dCDN1 transmitting a (e.g. HTTP) request for the data object to the uCDN node and the uCDN node receiving this request in step 103. If the uCDN node does not possess the data object itself, the uCDN node transmits a (e.g. HTTP) request for the data object to the CSP server in step 105. The CSP server receives this request in step 107 and returns the requested data object in step 109. The uCDN node receives the data object in step 111 and transmits the data object to dCDN1 in step 112. dCDN1 receives the data object in step 113. Steps 101-113 of FIG. 4 are performed between steps 89 and 91 of FIG. 2.

Figure 5:
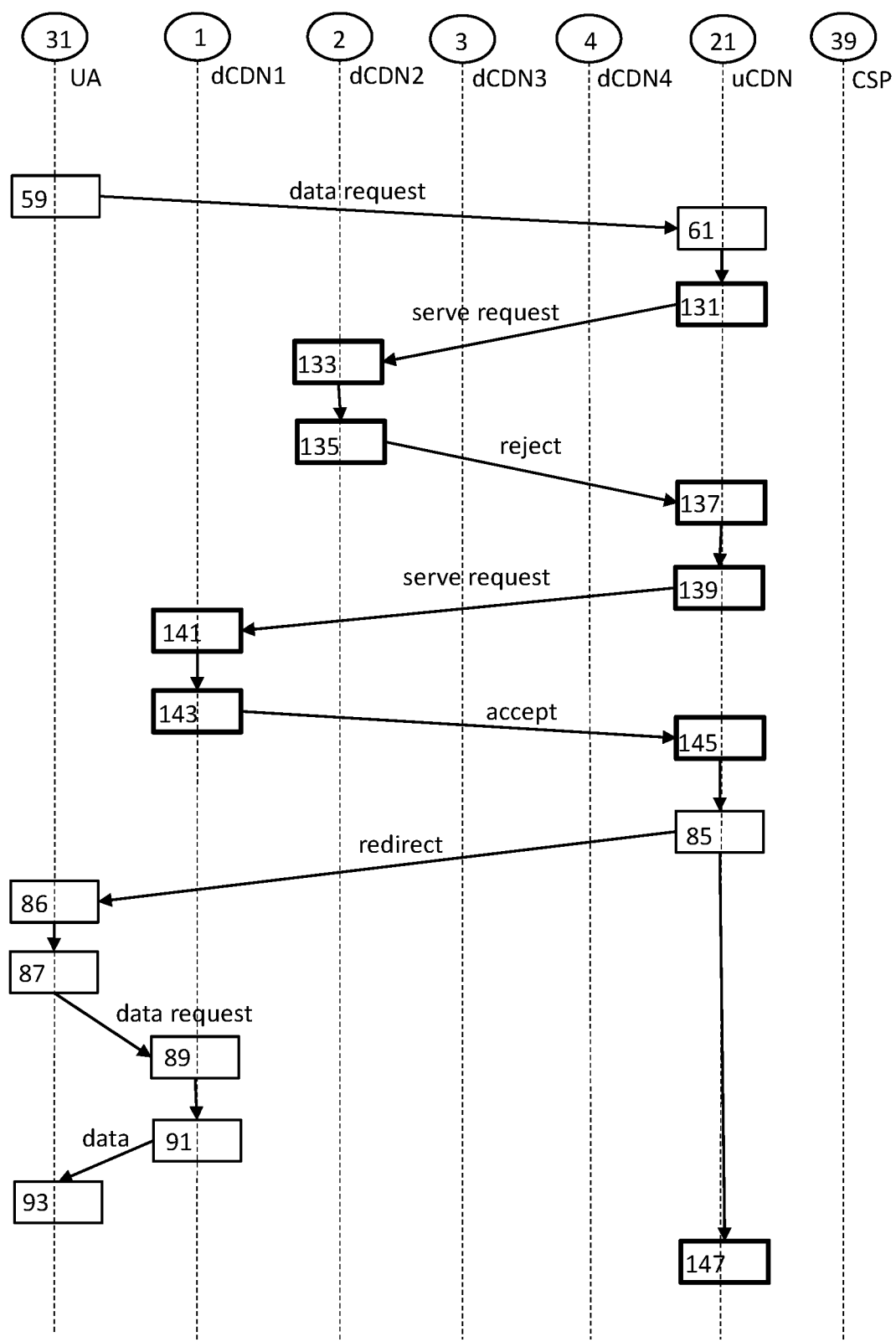
FIG. 5 is a flow diagram of a first half of another method, according to example embodiments.
Figure 6:
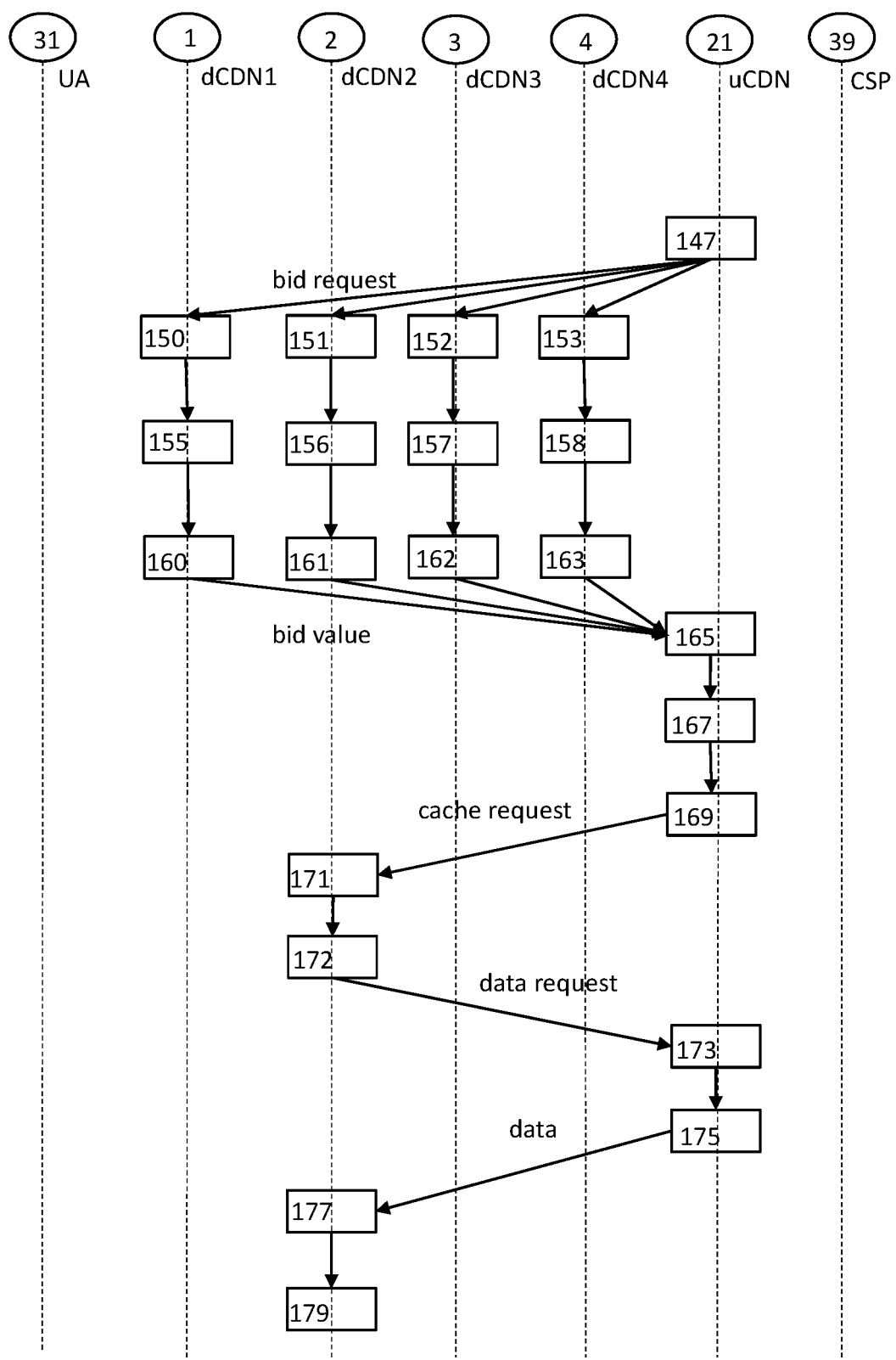
FIG. 6 is a flow diagram of a second half of the method of claim 5, according to example embodiments.

In the embodiment of FIG. 2, the dCDN nodes bid for serving a data object. In the embodiment of FIGS. 5 and 6, the dCDN nodes bid for caching a data object and the uCDN determines in a conventional way to which of the dCDN nodes the data object request is redirected. After the uCDN node receives the data object request in step 61, it transmits a serve request, e.g. an RI request as specified in RFC 7975, to a first one of the dCDN nodes: dCDN2. In this embodiment, the uCDN has a choice of dCDNs and uses configured policies to decide which dCDNs to query and in which order to query them.

A step 133 comprises dCDN2 receiving the serve/RI request. A step 135 comprises dCDN2 transmitting a response to the uCDN node in which it rejects the serve/RI request. A step 137 comprises the uCDN node receiving the rejection. Alternatively, dCDN2 could have refrained from sending a response to the serve/RI request in case it did not want to serve the data object and step 137 might in this case have comprised a timeout expiration event at the uCDN node. A step 139 comprises the uCDN node transmitting a serve/RI request to another one of the dCDN nodes: dCDN1.

A step 141 comprises dCDN1 receiving the serve/RI request. A step 143 comprises dCDN1 transmitting a response to the uCDN node in which it accepts the serve/RI request. A step 145 comprises the uCDN node receiving the acceptance. A step 85 comprises the uCDN server sending a response to the UA in order to redirect the data object request to dCDN1, e.g. by transmitting an HTTP response with a status code beginning with 3 and an URI of dCDN1, which causes the UA's browser to transmit a new data request with the URI of dCDN1 in step 87 after receipt of the response in step 86.

After performing step 85, the uCDN proceeds with a step 147 in order to determine which of the four dCDN nodes should cache the data object. Step 147 comprises the uCDN node transmitting bid requests to the four dCDN nodes. The bid requests comprise information relating to the data object and request the four dCDN nodes to provide a bid value for caching the data object. FIG. 6 shows steps 150 to 153, which are performed after step 147 by the four dCDN nodes. Steps 151 to 153 are similar to steps 65 to 68 shown in FIG. 2. Furthermore, steps 155 to 167 of FIG. 6 are similar to steps 71 to 83 of FIG. 2, although steps 155 to 167 (only) relate to an auction of the right to cache the data object and not to an auction of the right to serve the data object. The dCDN nodes may be configured to determine from the bid request whether the auction relates to the right to cache the data object, the right to serve the data object or the right to cache and serve the data object. The type of auction may be specified in a header or data field of the bid request, for example.

After the uCDN node has determined which dCDN node won the auction in step 167, the uCDN node transmits a cache request to the winner of the auction, dCDN2 in the example of FIG. 6, in step 169. A step 171 comprises dCDN2 receiving the cache request from the uCDN node. In the embodiment of FIG. 6, dCDN2 then transmits a data object request to the uCDN in step 172 to obtain the data object. Alternatively, the cache request might specify where the dCDN node is able to obtain the data object, which might be a different location than at the uCDN node that held the auction. The uCDN receives the data object request in step 173 and returns the data object to dCDN2 in step 175. Step 177 comprises dCDN2 receiving the data object from the uCDN. Step 179 comprise dCDN2 storing the received data object in its cache.

Figure 7:
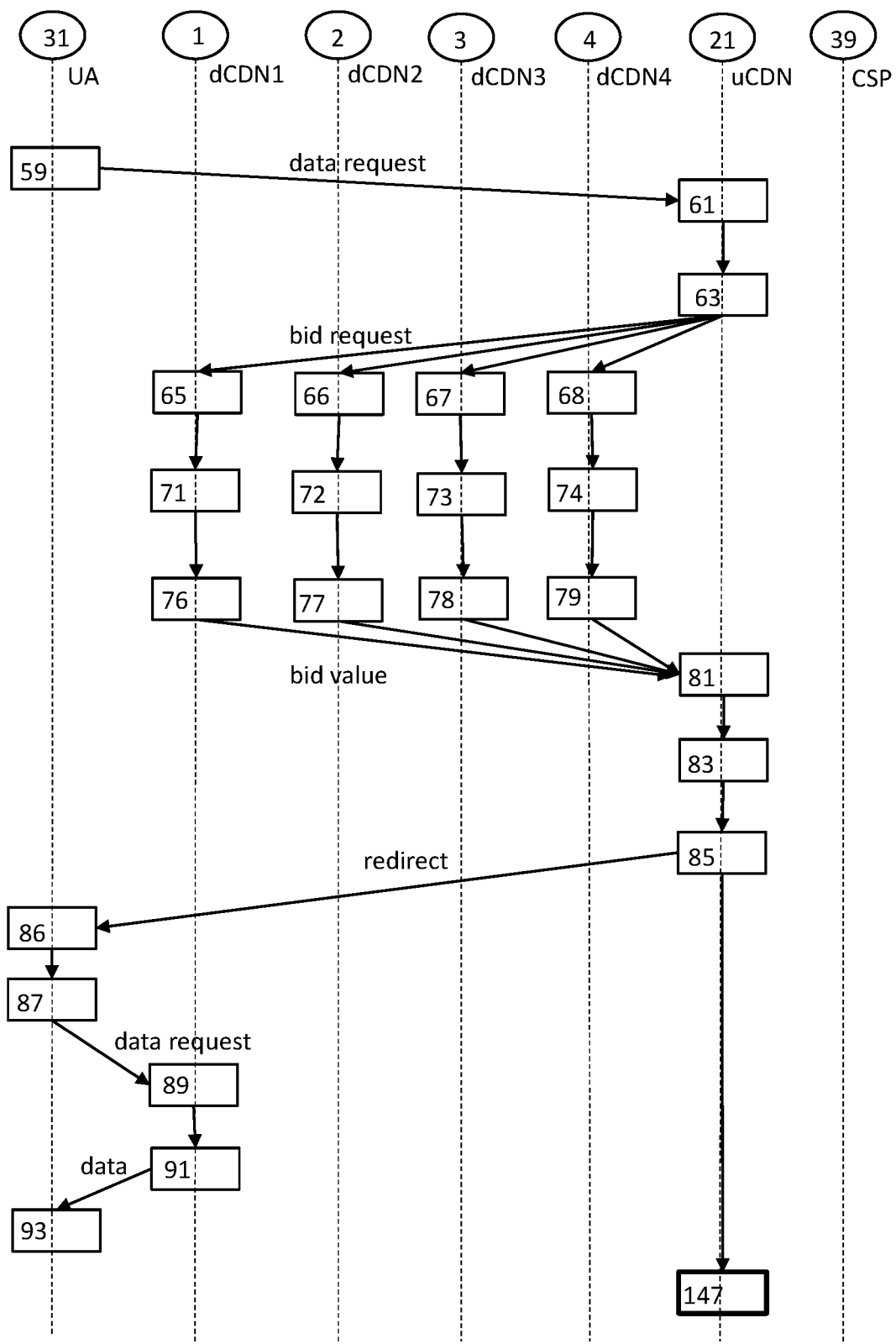
FIG. 7 is a flow diagram of an alternative to the first half of the method of FIG. 5, according to example embodiments.

In the embodiment of FIG. 2, a single auction was held for the right to serve a data object. In the embodiment of FIG. 3, a single auction was held for the rights to serve and cache a data object. In the embodiment of FIGS. 5 and 6, a single auction was held for the right to cache a data object. In the embodiment shown in FIG. 7, the auction of FIG. 2 is combined with the auction of FIG. 6, i.e. steps 131 to 145 of FIG. 5 are replaced with steps 63 to 83 of FIG. 2. As shown in FIG. 7, step 147 of FIG. 6 is performed after step 85. This results in two independent auctions being held for the right to serve a data object and the right to cache this data object. In the example of FIGS. 6 and 7, the dCDN nodes participating in both auctions are the same, but this is not required.

Figure 8:
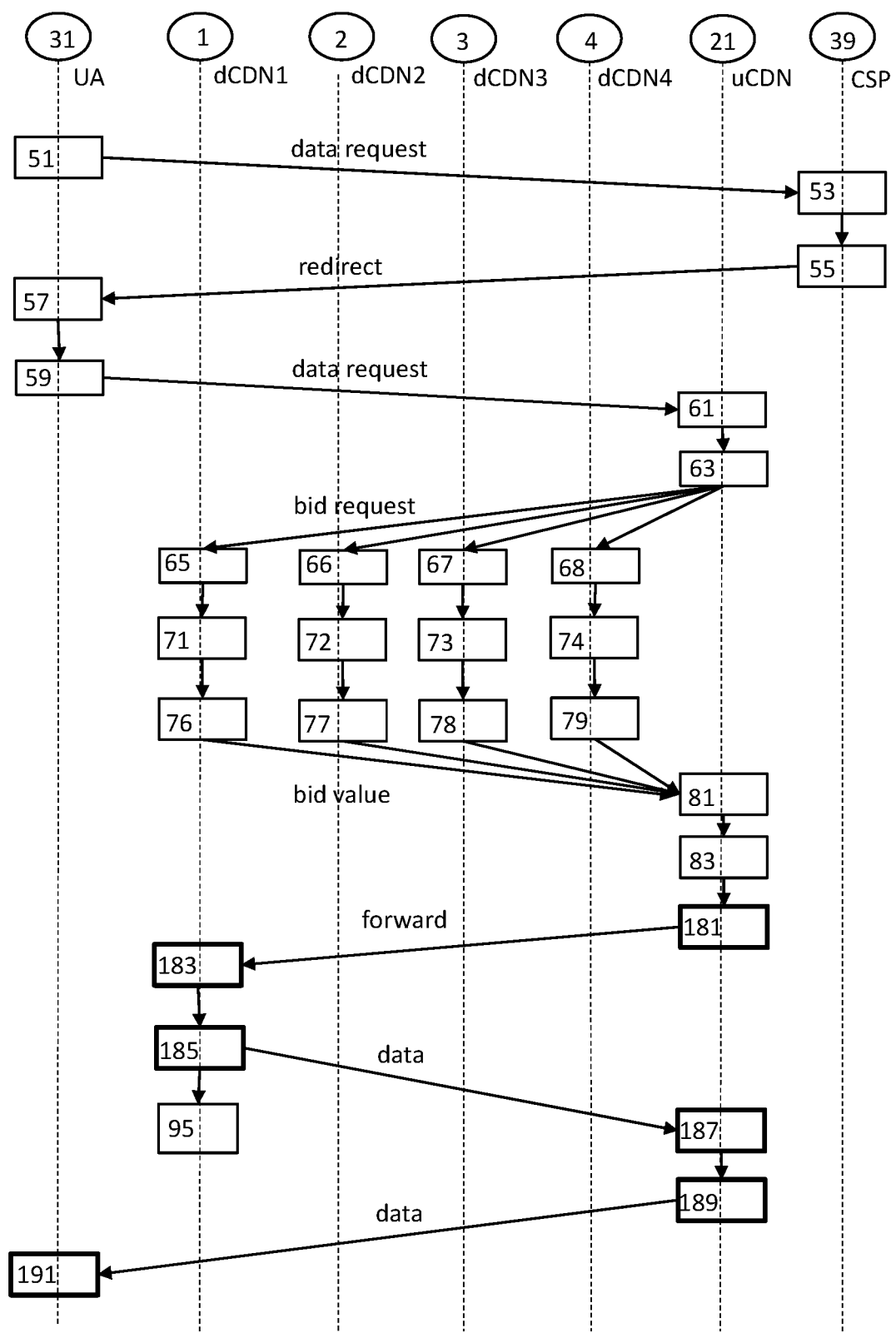
FIG. 8 is a flow diagram of another method, according to example embodiments.

In the embodiments of FIGS. 2 to 7, the uCDN node redirects the data request to dCDN1 in step 85. In the embodiment of FIG. 8, the uCDN node forwards the data request to dCDN1 (in step 181) instead of redirecting it. This is especially beneficial in case of load balancing between dCDN nodes of the same proprietor (who is typically also the proprietor of the uCDN node). In step 183, dCDN1 receives the forwarded data request from the uCDN node and responds by transmitting the requested data object to the uCDN in step 185. If dCDN1 has not stored the requested data object or the latest version thereof in its cache yet, it may do so in step 95. In this case, dCDN1 may obtain the data object separately (not shown in FIG. 8). The uCDN node receives the data object from dCDN1 in step 187 and forwards the data object to the UA in step 189. The UA receives the data object from dCDN1 via the uCDN in step 191.

Since the response to the data request, which comprises the data object, follows the same path as the data request, the dCDN nodes and the uCDN node are preferably located not more than a few hops away from each other. In an alternative embodiment, dCDN1 transmits the data object directly to the UA, i.e. does not transmit it to the uCDN node first. This may require the endpoint of a TCP connection between the UA and the uCDN to be transferred from the uCDN node to dCDN1. It may be possible to implement this by using Software-Defined Networking (SDN), for example. In the embodiment of FIG. 8, the data request is forwarded by the uCDN node to dCDN1 in step 181, but the CSP server still redirects the data request to the uCDN node in step 55. In an alternative embodiment, the CSP server forwards the data request to the uCDN node instead of redirecting it.

Figure 9:
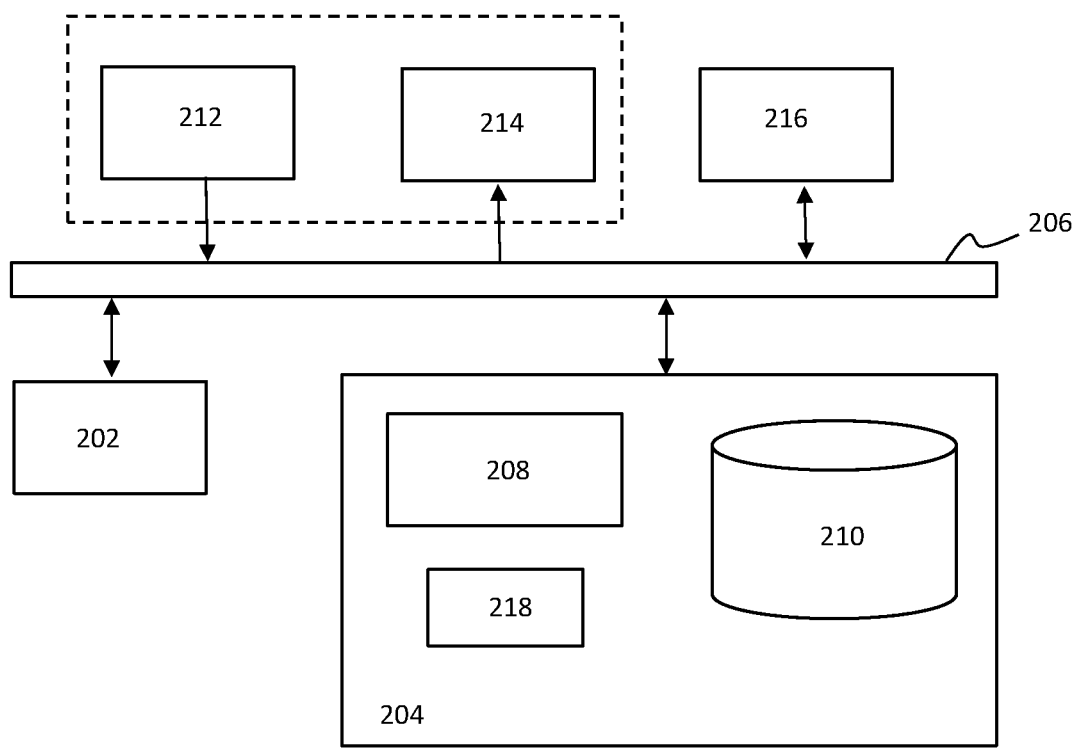
FIG. 9 is a block diagram of an data processing system for performing the herein-described methods, according to example embodiments.

FIG. 9 depicts a block diagram illustrating an exemplary data processing system that may perform the methods as described with reference to FIGS. 2-8.

As shown in FIG. 9, the data processing system 200 may include at least one processor 202 coupled to memory elements 204 through a system bus 206. As such, the data processing system may store program code within memory elements 204. Further, the processor 202 may execute the program code accessed from the memory elements 204 via a system bus 206. In one aspect, the data processing system may be implemented as a computer that is suitable for storing and/or executing program code. It should be appreciated, however, that the data processing system 200 may be implemented in the form of any system including a processor and a memory that is capable of performing the functions described within this specification.

The memory elements 204 may include one or more physical memory devices such as, for example, local memory 208 and one or more bulk storage devices 210. The local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code is retrieved from the bulk storage device 210 during execution.

Input/output (I/O) devices depicted as an input device 212 and an output device 214 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 200, and a data transmitter for transmitting data from the data processing system 200 to said systems, devices and/or networks. Modems, cable modems, and Ethernet cards are examples of different types of network adapter that may be used with the data processing system 200.

As pictured in FIG. 9, the memory elements 204 may store an application 218. In various embodiments, the application 218 may be stored in the local memory 208, he one or more bulk storage devices 210, or separate from the local memory and the bulk storage devices. It should be appreciated that the data processing system 200 may further execute an operating system (not shown in FIG. 9) that can facilitate execution of the application 218. The application 218, being implemented in the form of executable program code, can be executed by the data processing system 200, e.g., by the processor 202. Responsive to executing the application, the data processing system 200 may be configured to perform one or more operations or method steps described herein.

Various embodiments of the disclosure may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 202 described herein.

The terminology used herein is for the purpose of describing particular embodiments only and is not intended to be limiting the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present disclosure has been presented for purposes of illustration, but is not intended to be exhaustive or limited to the implementations in the form disclosed. Many modifications and variations will be apparent to those of ordinary skill in the art without departing from the scope and spirit of the present disclosure. The embodiments were chosen and described in order to best explain the principles and some practical applications of the present disclosure, and to enable others of ordinary skill in the art to understand the present disclosure for various embodiments with various modifications as are suited to the particular use contemplated.

The invention claimed is:

1. A system for requesting a bid for serving and/or caching a data object-in a Content Delivery Network (CDN), the system comprising:
at least one receiver;
at least one transmitter; and
at least one processor,
wherein the system is a Content Service Provider (CSP) server or an upstream Content Delivery Network (uCDN) node,
and wherein the at least one processor is configured to:
use the at least one receiver to receive a data object request to serve the data object, the data object request identifying the data object,
use the at least one transmitter to transmit bid requests to a plurality of downstream CDN (dCDN) nodes comprised in the CDN, the bid requests comprising information relating to the data object and requesting the plurality of dCDN nodes to provide a bid value for serving and/or caching the data object,
determine a best bid from one or more bid values received in response to the transmitted bid requests, the received one or more bid values is based on at least one of the following parameters:
availability of resources in the dCDN node;
availability of the data object in one or more memories of the dCDN node;
content provider of the data object;
proprietor of the system;
expected popularity of the data object; or
content type of the data object; and
use the at least one transmitter to redirect or forward the data object request to the dCDN node in the CDN which transmitted the best bid and/or request the dCDN node in the CDN which transmitted the best bid to cache the data object.

2. The system of claim 1, wherein the at least one processor is configured to use the at least one transmitter to transmit the data object to the dCDN node which transmitted the best bid.

3. The system of claim 2, wherein the at least one processor is configured to use the at least one transmitter to transmit a request for the data object to a content provider server if the data object is not stored in a memory of the system and use the at least one receiver to receive the data object from the content provider server.

4. A downstream content delivery network (dCDN) node for providing a bid for serving and/or caching a data object in a Content Delivery Network (CDN), the dCDN node comprising:
at least one receiver;
at least one transmitter; and
at least one processor,
wherein the at least one processor is configured to:
receive, by the at least one receiver, a bid request from a system, the system being a Content Service Provider (CSP) server or an upstream Content Delivery Network (uCDN) node, the bid request comprising information relating to the data object and requesting the dCDN node comprised in the CDN to provide a bid value for serving and/or caching a data object,
determine the bid value in response to the request, wherein the received bid value is based on at least one of the following parameters:

availability of resources in the dCDN node;
availability of the data object in one or more memories of the dCDN node;
content provider of the data object;
proprietor of the system;
expected popularity of the data object; or
content type of the data object; and
use the at least one transmitter to transmit the bid value to the system, wherein the at least one processor is further configured to use the at least one transmitter to serve the data object to a requestor in response to receiving a data object request, the data object request identifying the data object, and/or the at least one processor is further configured to cache the data object in a memory of the dCDN node in response to receiving a data object or cache request identifying the data object.

5. The dCDN node of claim 4, wherein the at least one processor is configured to determine the bid value based on whether the dCDN node wants to cache the data object in response to receiving a request to cache the data object.

6. The dCDN node of claim 5, wherein the at least one processor is configured to determine a poor bid value if the data object is stored in a memory of the dCDN node.

7. The dCDN node of claim 5, wherein the at least one processor is configured to only transmit the bid value to the system if the data object is not stored in a memory of the dCDN node.

8. The dCDN node of claim 4, wherein the at least one processor is configured to determine the bid value based on whether the dCDN node wants to cache the data object in response to receiving a request to serve the data object.

9. The dCDN node of claim 4, wherein the at least one processor is configured to use the at least one transmitter to request the data object from the system, from a location identified in the data object request or from a location identified in the cache request.

10. The system of dCDN node 4, wherein the at least one processor is configured to determine the bid value based on at least one of the following parameters relating to the requestor identified in the data object request:
location of the requestor;
network access provider of the requestor; or
time it takes data to travel from the dCDN node to the requestor.

11. A method of requesting a bid for serving and/or caching a data object in a Content Delivery Network (CDN), the method comprising:
receiving at a system being a Content Service Provider (CSP) server or an upstream Content Delivery Network (uCDN) node, a data object request to serve the data object, the data object request identifying the data object;
transmitting from the system bid requests to a plurality of downstream CDN (dCDN) nodes, the bid requests comprising information relating to the data object and requesting the plurality of dCDN nodes comprised in the CDN to provide a bid value for serving and/or caching the data object;
in the system, determining a best bid from one or more bid values received in response to the transmitted bid requests, the received one or more bid values is based on at least one of the following parameters:
availability of resources in the dCDN node;
availability of the data object in one or more memories of the dCDN node;
content provider of the data object;
proprietor of the system;
expected popularity of the data object; or
content type of the data object; and
redirecting or forwarding the data object request to the dCDN node in the CDN which transmitted the best bid and/or requesting the dCDN node in the CDN which transmitted the best bid to cache the data object.

12. A method of providing a bid for serving and/or caching a data object, the method comprising:
receiving at a downstream Content Delivery Network (dCDN) node comprised in a Content Delivery Network (CDN) a bid request from a system, the system being a Content Service Provider (CSP) server or an upstream Content Delivery Network (uCDN) node, the bid request comprising information relating to the data object and requesting the dCDN node to provide a bid value for serving and/or caching the data object;
in the dCDN node, determining the bid value in response to the request, wherein the received bid value is based on at least one of the following parameters:
availability of resources in the dCDN node;
availability of the data object in one or more memories of the dCDN node;
content provider of the data object;
proprietor of the system;
expected popularity of the data object; or
content type of the data object;
transmitting the bid value to the system; and
serving the data object to a requestor in response to receiving a data object request, the data object request identifying the data object, and/or
caching the data object in a memory of the dCDN node in response to receiving the data object or cache request identifying the data object.

13. A non-transitory computer-readable medium having instructions stored thereon that, when executed by one or more processors of a system, cause the system to carry out operations including:
receiving at the system, the system being a Content Service Provider (CSP) server or an upstream Content Delivery Network (uCDN) node, a data object request to serve the data object, the data object request identifying the data object;
transmitting from the system bid requests to a plurality of downstream CDN (dCDN) nodes comprised in a Content Delivery Network (CDN), the bid requests comprising information relating to the data object and requesting the plurality of dCDN nodes to provide a bid value for serving and/or caching the data object;
in the system, determining a best bid from one or more bid values received in response to the transmitted bid requests, the received one or more bid values is based on at least one of the following parameters:
availability of resources in the dCDN node;
availability of the data object in one or more memories of the dCDN node;
content provider of the data object;
proprietor of the system;
expected popularity of the data object; or
content type of the data object; and
redirecting or forwarding the data object request to the dCDN node in the CDN which transmitted the best bid and/or requesting the dCDN node in the CDN which transmitted the best bid to cache the data object.

14. A non-transitory computer-readable medium having instructions stored thereon that, when executed by one or more processors of a downstream Content Delivery Network (dCDN) node comprised in a Content Delivery Network (CDN), cause the dCDN node to carry out operations including:
- receiving at the dCDN node a bid request from another system, the system being a Content Service Provider (CSP) server or an upstream Content Delivery Network (uCDN) node, the bid request comprising information relating to the data object and requesting the dCDN node to provide a bid value for serving and/or caching the data object;
- in the dCDN node, determining the bid value in response to the request, wherein the received bid value is based on at least one of the following parameters:
  - availability of resources in the dCDN node;
  - availability of the data object in one or more memories of the dCDN node;
  - content provider of the data object;
  - proprietor of the system;
  - expected popularity of the data object; or
  - content type of the data object;
- transmitting the bid value to the system; and
- serving the data object to a requestor in response to receiving a data object request, the data object request identifying the data object, and/or
- caching the data object in a memory of the dCDN node in response to receiving the data object or cache request identifying the data object.

* * * * *